(12) United States Patent
Mikawa et al.

(10) Patent No.: US 10,277,871 B2
(45) Date of Patent: Apr. 30, 2019

(54) IMAGE FORMATION UNIT AND IMAGE PROJECTION APPARATUS

(71) Applicants: Akihisa Mikawa, Kanagawa (JP); Yoshio Kubo, Tokyo (JP); Tetsuya Fujioka, Kanagawa (JP); Hideo Kanai, Tokyo (JP); Yasunari Mikutsu, Tokyo (JP); Satoshi Tsuchiya, Kanagawa (JP); Jun Mashimo, Tokyo (JP)

(72) Inventors: Akihisa Mikawa, Kanagawa (JP); Yoshio Kubo, Tokyo (JP); Tetsuya Fujioka, Kanagawa (JP); Hideo Kanai, Tokyo (JP); Yasunari Mikutsu, Tokyo (JP); Satoshi Tsuchiya, Kanagawa (JP); Jun Mashimo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/507,806

(22) PCT Filed: Sep. 24, 2015

(86) PCT No.: PCT/JP2015/004849
§ 371 (c)(1),
(2) Date: Mar. 1, 2017

(87) PCT Pub. No.: WO2016/067519
PCT Pub. Date: May 6, 2016

(65) Prior Publication Data
US 2017/0244940 A1 Aug. 24, 2017

(30) Foreign Application Priority Data
Oct. 27, 2014 (JP) .................................. 2014-218418

(51) Int. Cl.
*G02B 26/00* (2006.01)
*H04N 9/31* (2006.01)
(Continued)

(52) U.S. Cl.
CPC ......... *H04N 9/3144* (2013.01); *G02B 26/008* (2013.01); *G02B 26/085* (2013.01);
(Continued)

(58) Field of Classification Search
CPC ........ G02B 7/00; G02B 26/00; H04N 9/3141; H04N 5/7441
(Continued)

(56) References Cited

U.S. PATENT DOCUMENTS

| | | | |
|---|---|---|---|
| 6,366,387 B1* | 4/2002 | Wilson | G02B 7/00 348/203 |
| 6,422,704 B1 | 7/2002 | Gyoten et al. | |

(Continued)

FOREIGN PATENT DOCUMENTS

| | | |
|---|---|---|
| JP | H07-134275 | 5/1995 |
| JP | H08-129227 | 5/1996 |

(Continued)

OTHER PUBLICATIONS

International Search Report dated Dec. 1, 2015 in PCT/JP2015/004849 filed on Sep. 24, 2015.

(Continued)

*Primary Examiner* — Steven Whitesell Gordon
*Assistant Examiner* — Jerry L Brooks
(74) *Attorney, Agent, or Firm* — IPUSA, PLLC

(57) ABSTRACT

An image projection apparatus includes a light source, an image generation unit configured to receive light from the light source and generate an image based on the received light, a projection optical system unit configured to project the image generated by the image generation unit, a heat dissipation unit configured to dissipate heat of the image generation unit, and a movable member configured such that a position of the movable member is movable relative to the projection optical system unit, wherein the image generation
(Continued)

unit and the heat dissipation unit are mounted on the movable member.

16 Claims, 17 Drawing Sheets

(51) Int. Cl.
    *G03B 21/16*     (2006.01)
    *G03B 33/00*     (2006.01)
    *G02B 26/08*     (2006.01)
    *G03B 21/14*     (2006.01)
    *G03B 21/20*     (2006.01)

(52) U.S. Cl.
    CPC ........... *G03B 21/142* (2013.01); *G03B 21/16* (2013.01); *G03B 21/204* (2013.01); *G03B 33/00* (2013.01); *H04N 9/315* (2013.01)

(58) Field of Classification Search
    USPC .......................................................... 353/30
    See application file for complete search history.

(56) References Cited

U.S. PATENT DOCUMENTS

| | | |
|---|---|---|
| 6,880,937 B2 | 4/2005 | Hayashi |
| 7,180,557 B2 * | 2/2007 | Shimizu ............... H04N 9/3105 348/E9.027 |
| 9,100,598 B2 | 8/2015 | Kaminaga et al. |
| 2005/0195504 A1 | 9/2005 | Von Poncet et al. |
| 2011/0019157 A1 | 1/2011 | He |
| 2011/0019158 A1 | 1/2011 | He |
| 2013/0242269 A1 | 9/2013 | Kanai et al. |
| 2014/0036239 A1 | 2/2014 | Mashitani |

FOREIGN PATENT DOCUMENTS

| | | |
|---|---|---|
| JP | 2001-356411 | 12/2001 |
| JP | 2005-084581 | 3/2005 |
| JP | 2007-248721 | 9/2007 |
| JP | 2008-070494 | 3/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 5379647 | 12/2013 |

OTHER PUBLICATIONS

Extended European Search Report for 15854915.4 dated Jul. 7, 2017.

Office Action dated Jul. 9, 2018 issued with respect to the corresponding Chinese Patent Application No. 201580057676.7.

* cited by examiner

[Fig. 1]
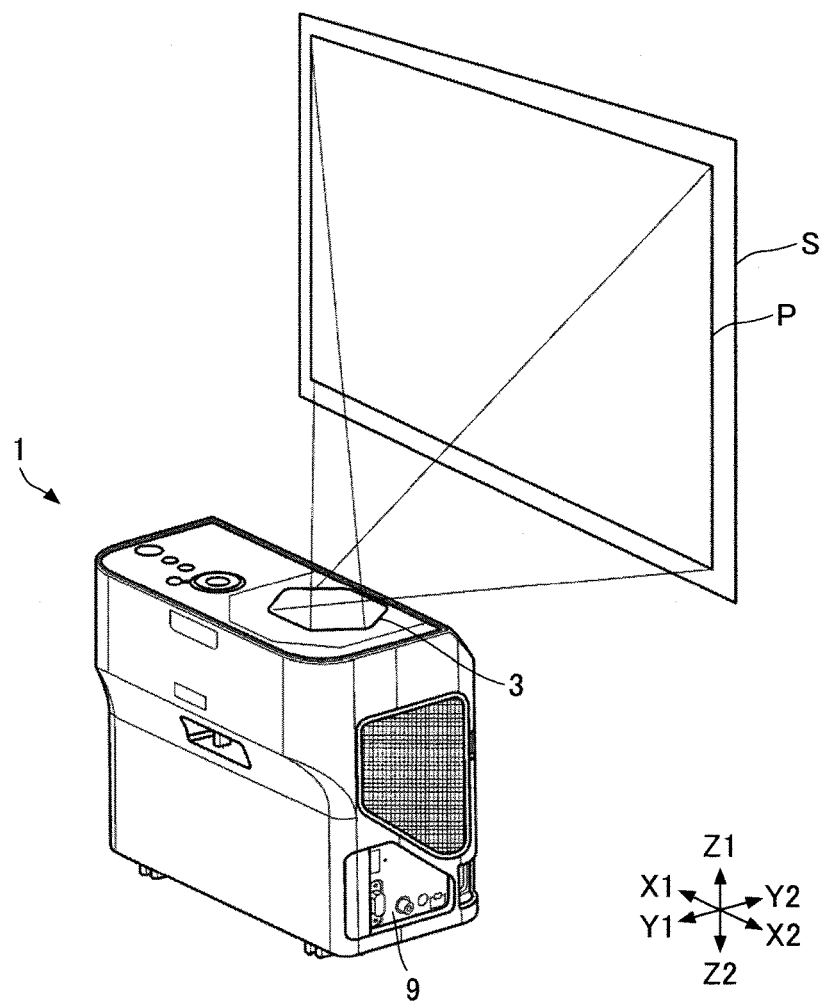

[Fig. 2]
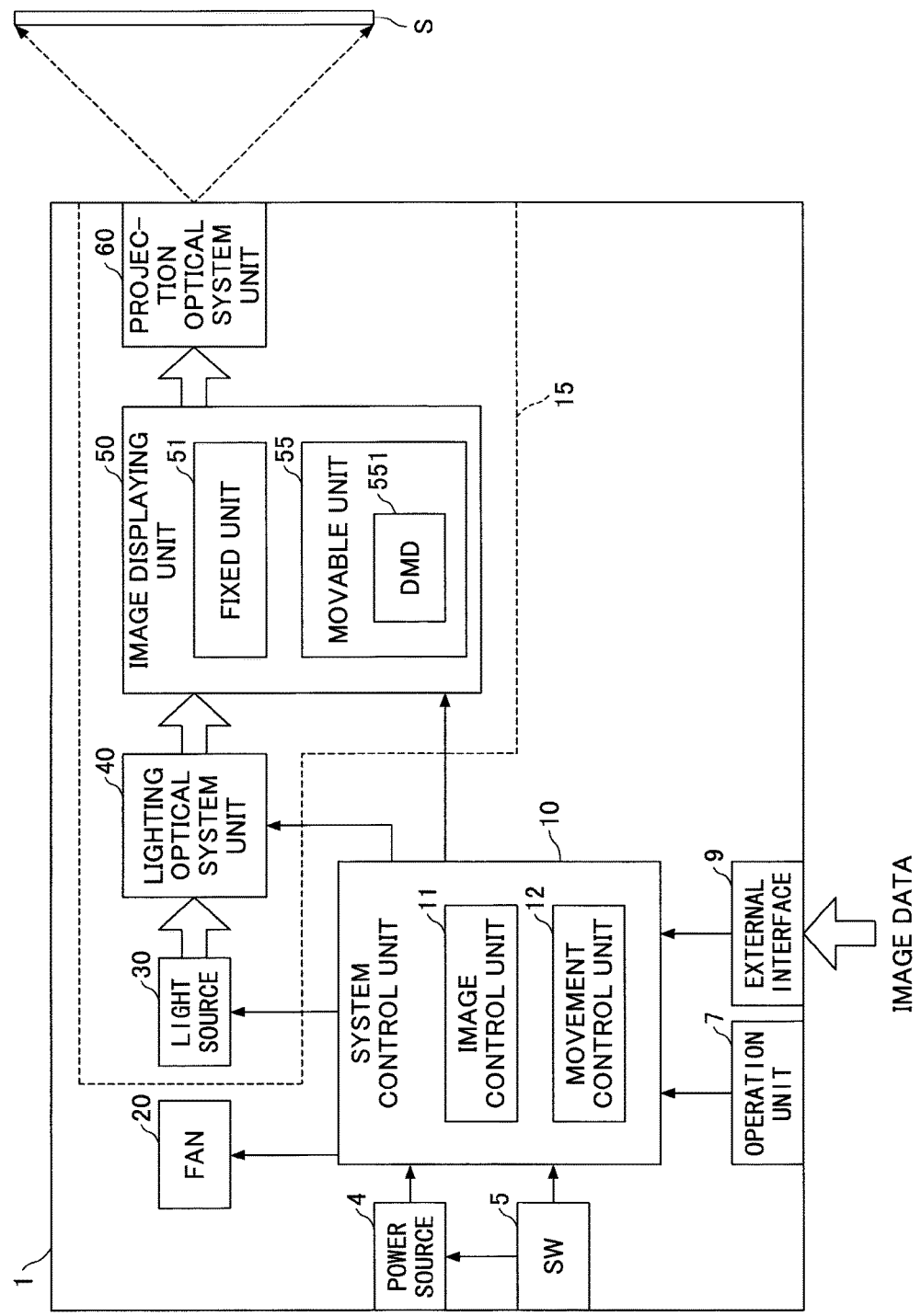

[Fig. 3]
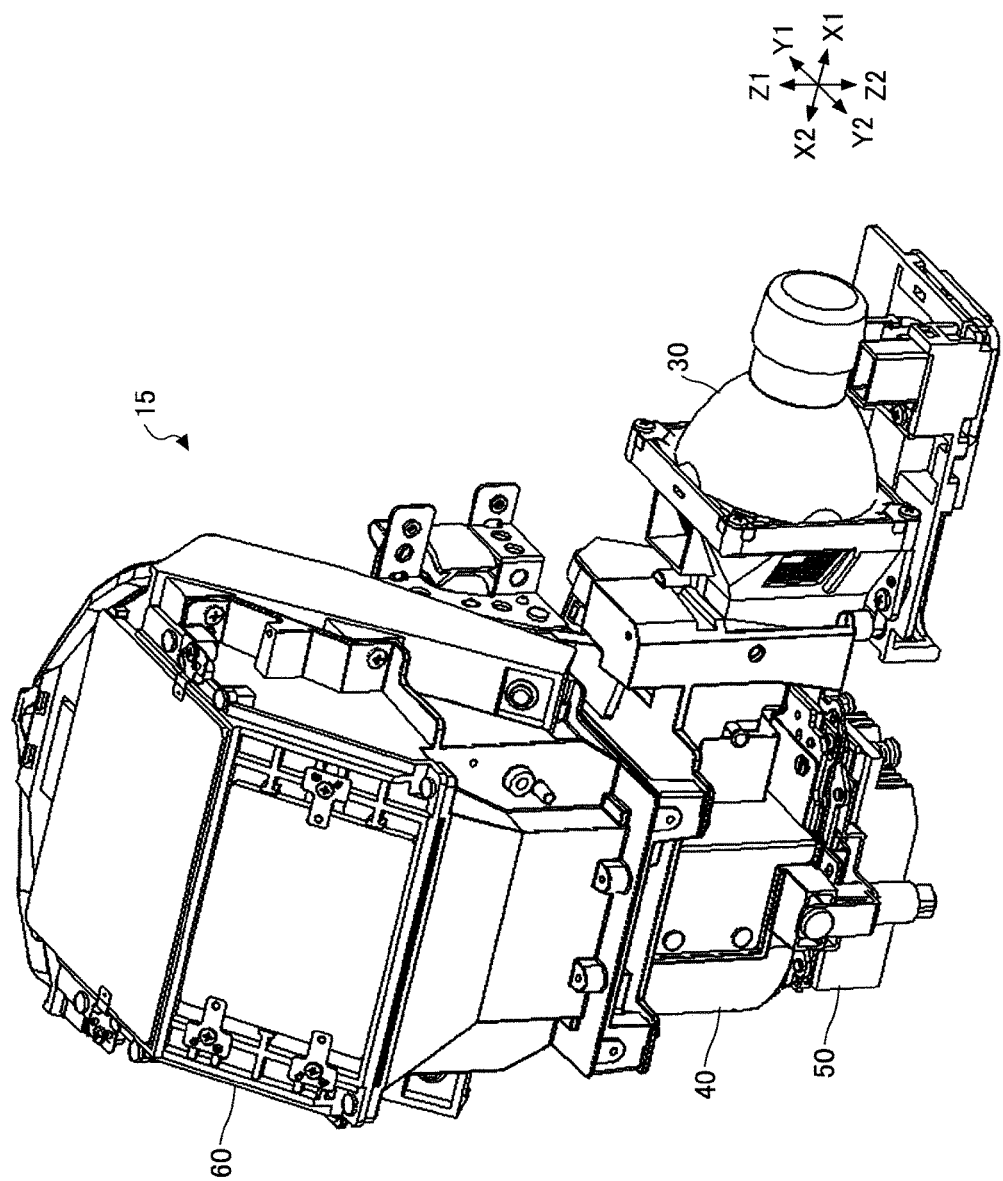

[Fig. 4]
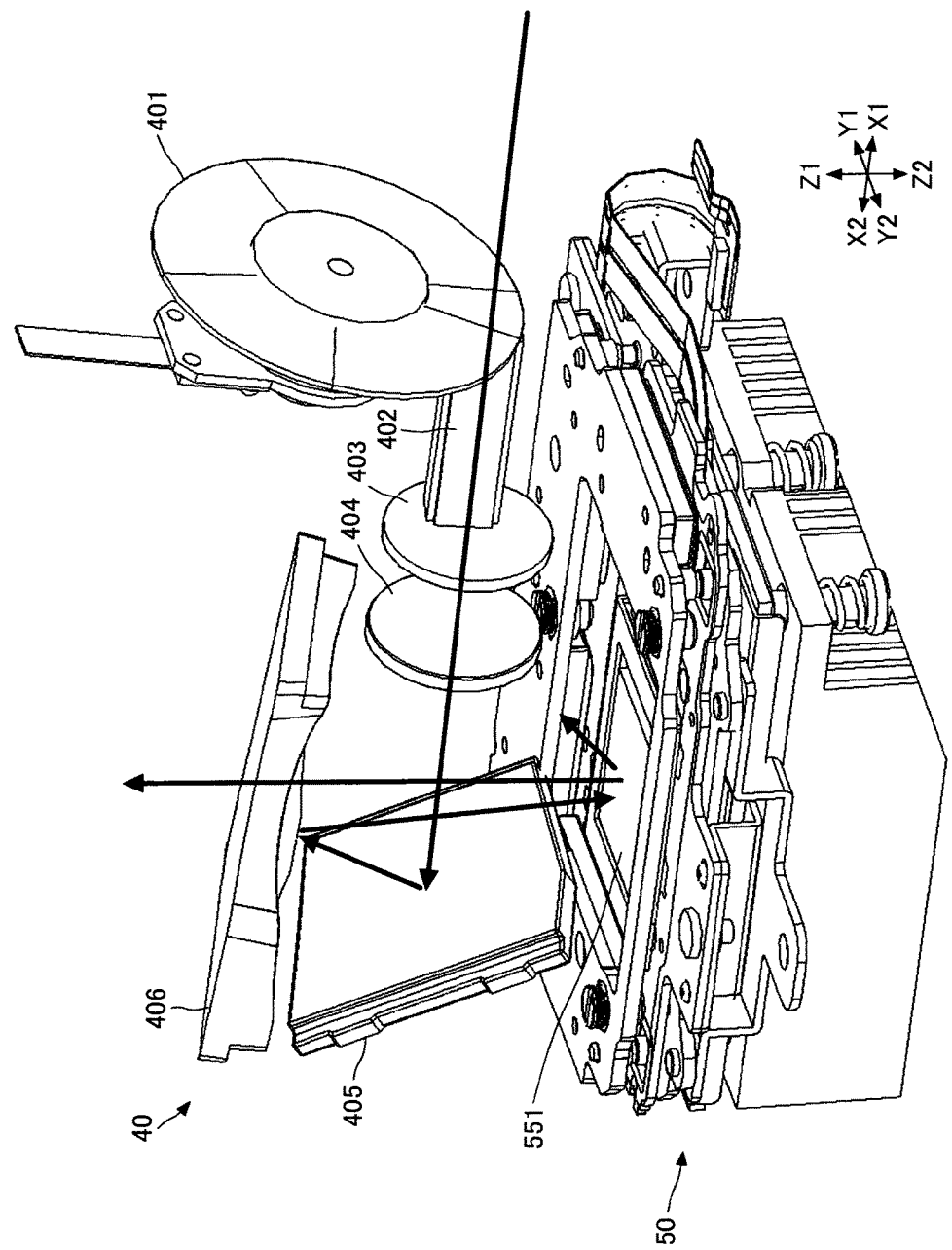

[Fig. 5]
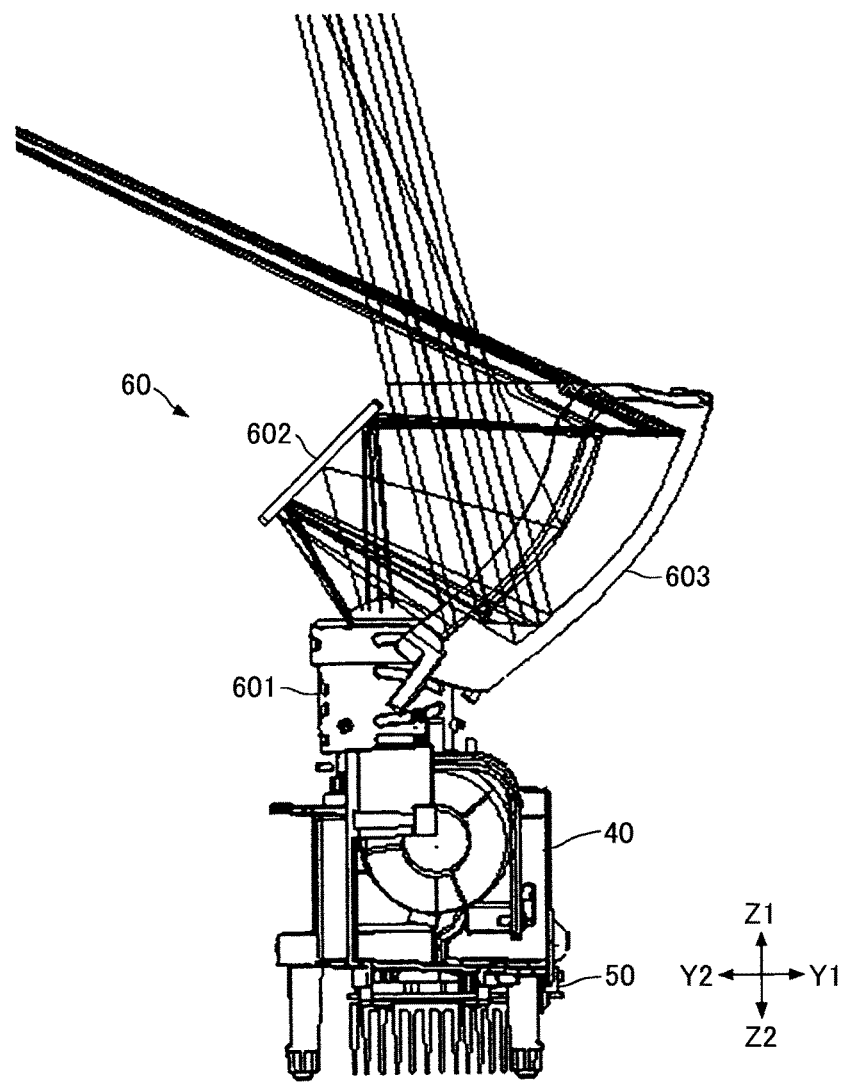

[Fig. 6]
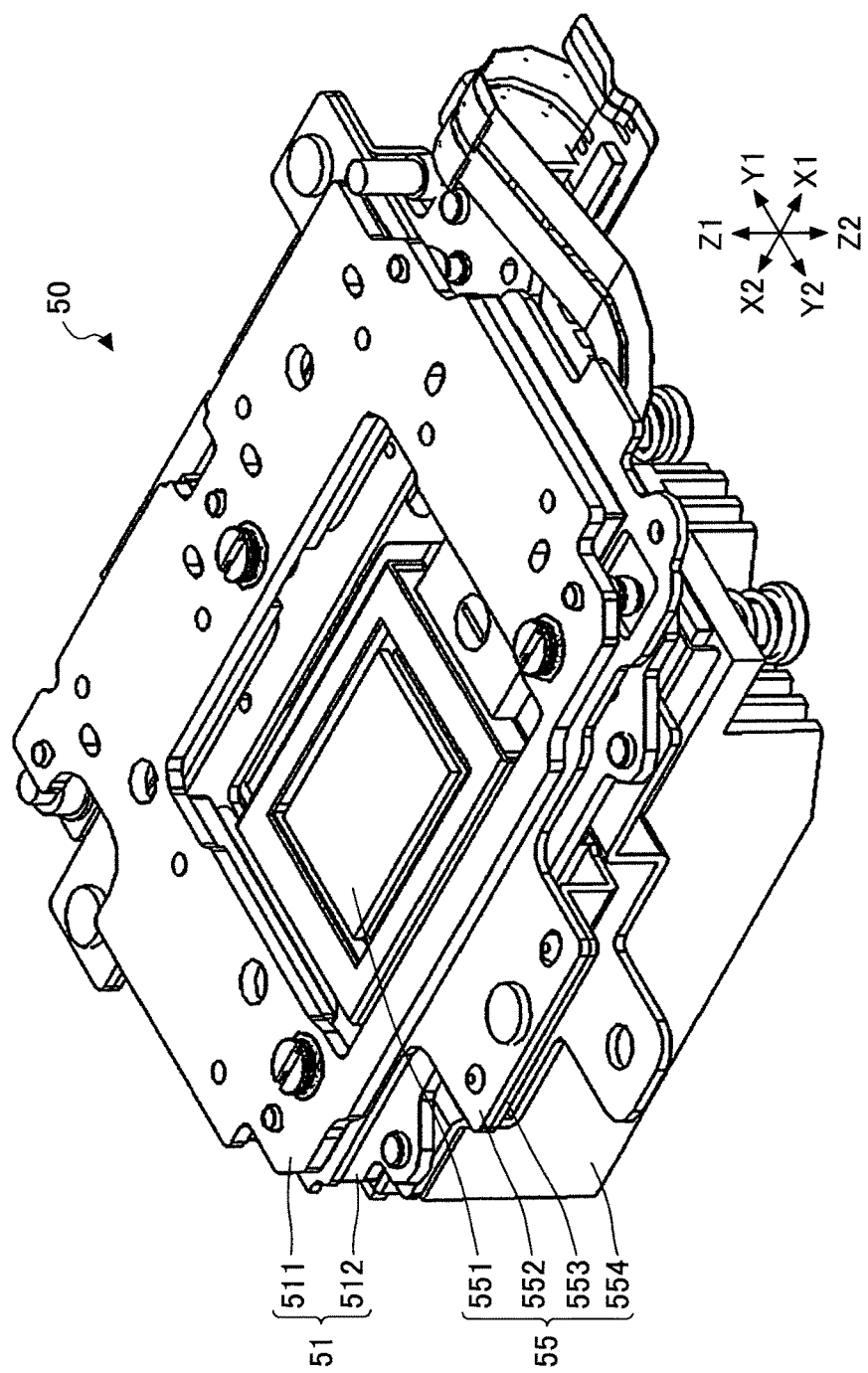

[Fig. 7]
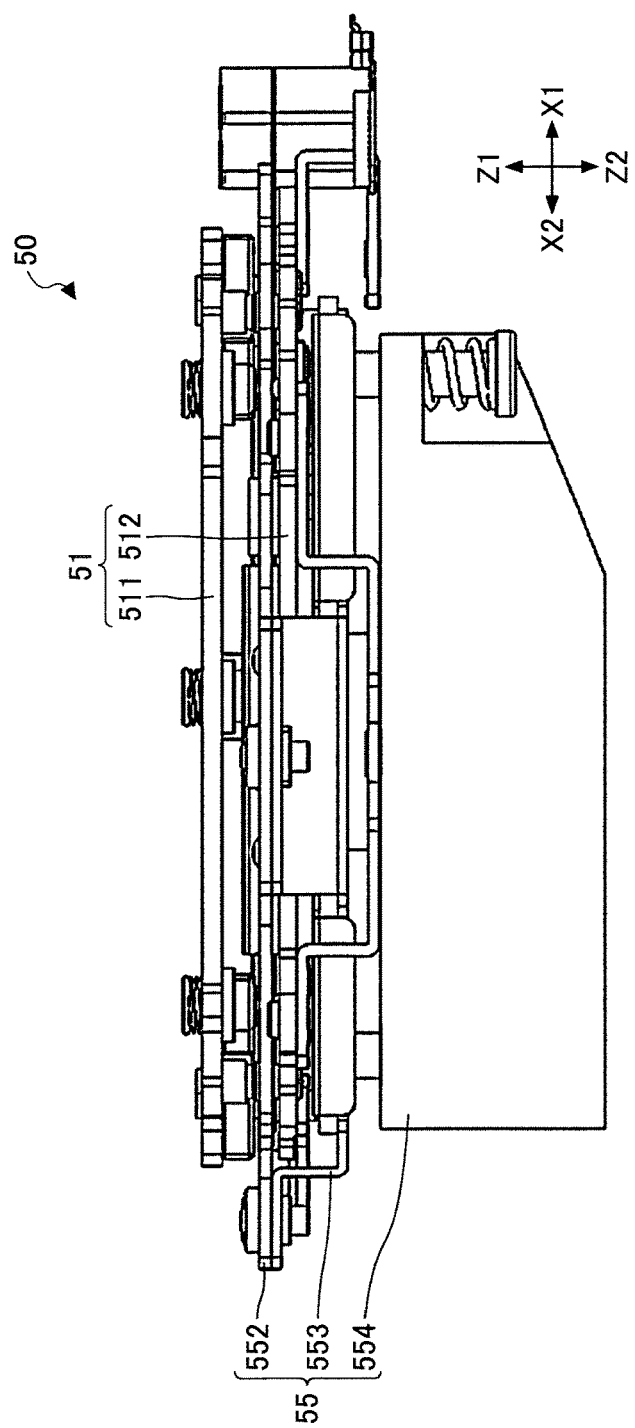

[Fig. 8]
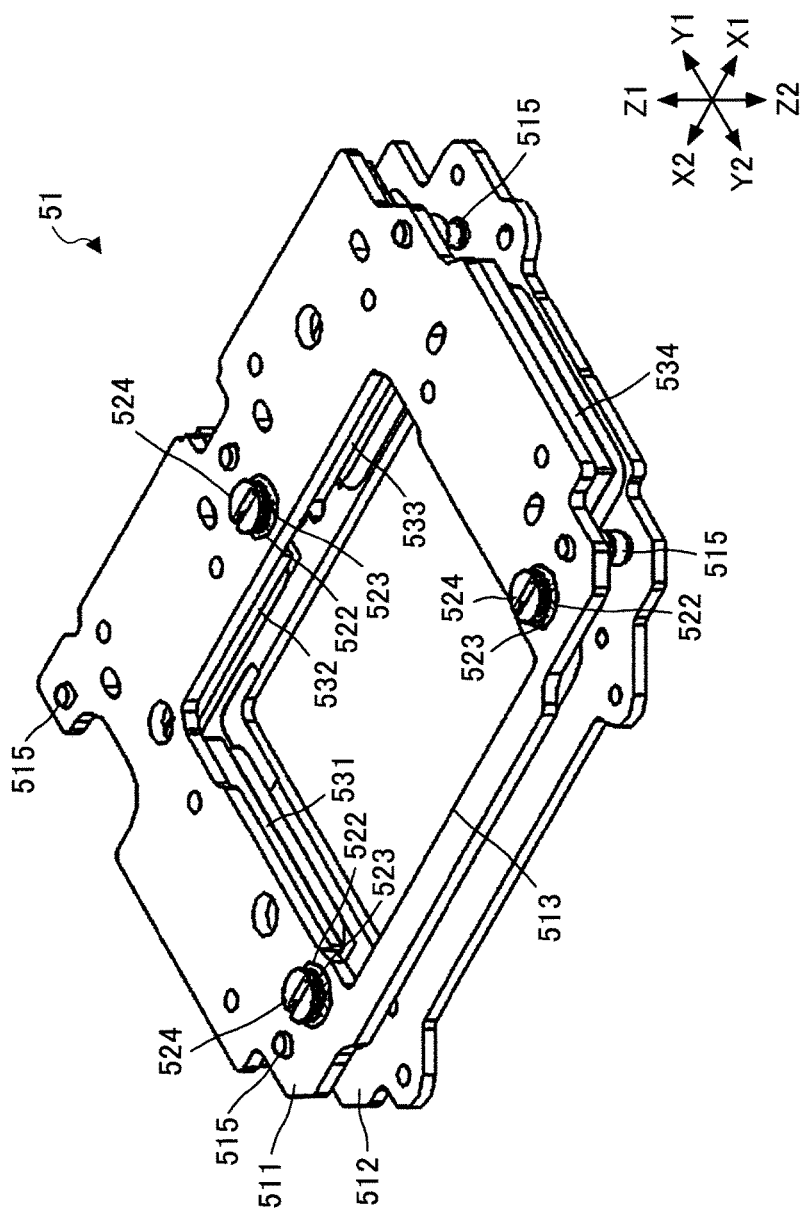

[Fig. 9]
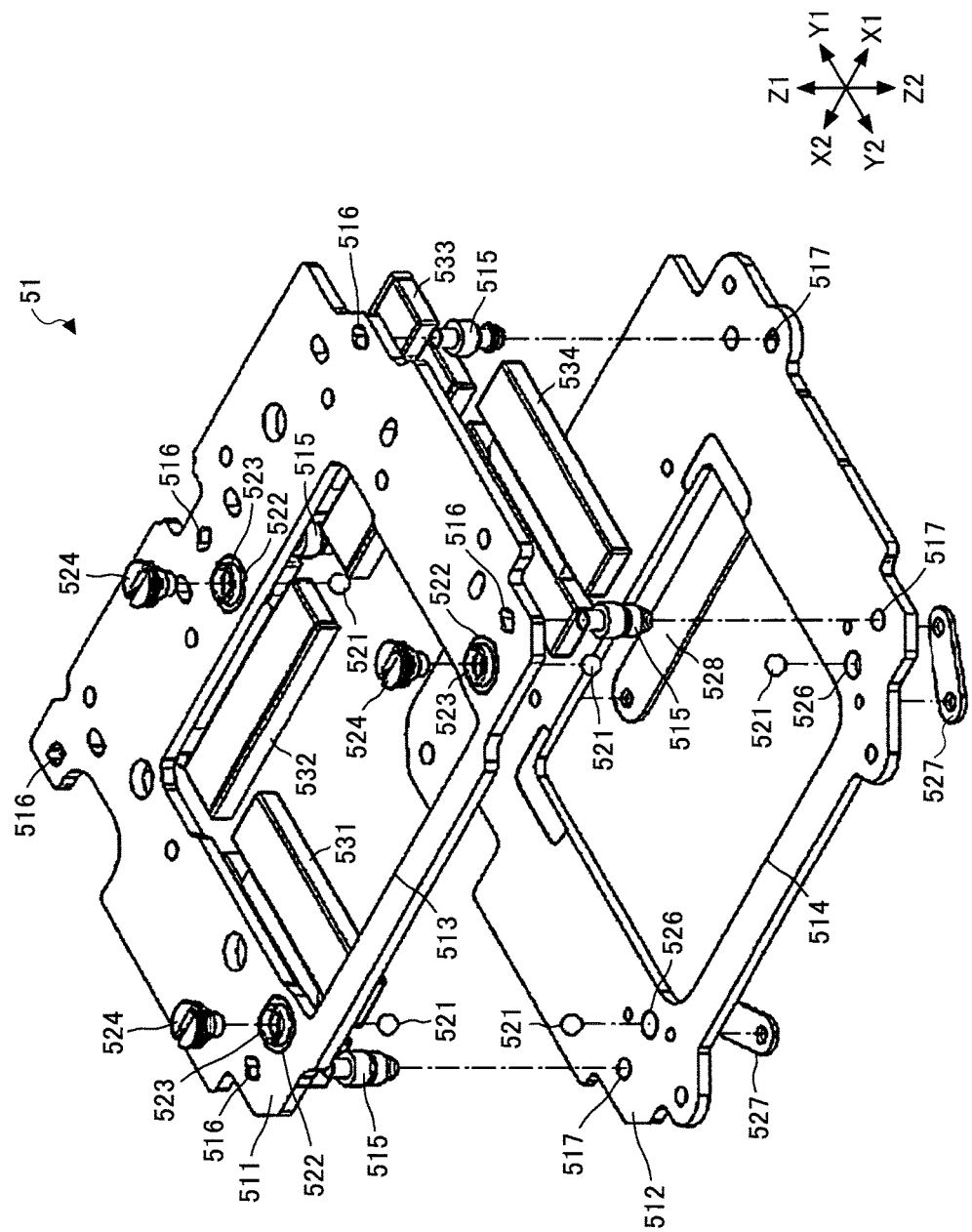

[Fig. 10]
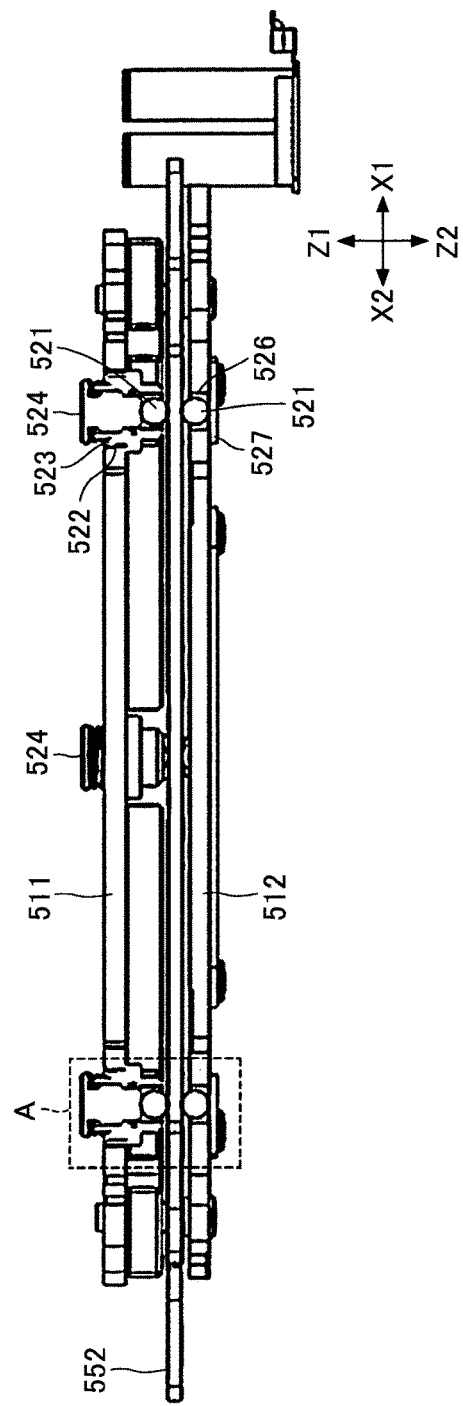

[Fig. 11]
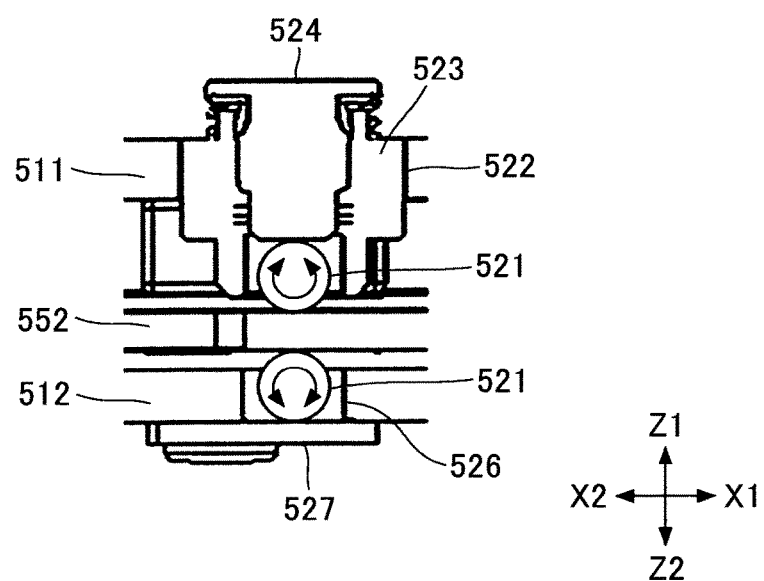

[Fig. 12]
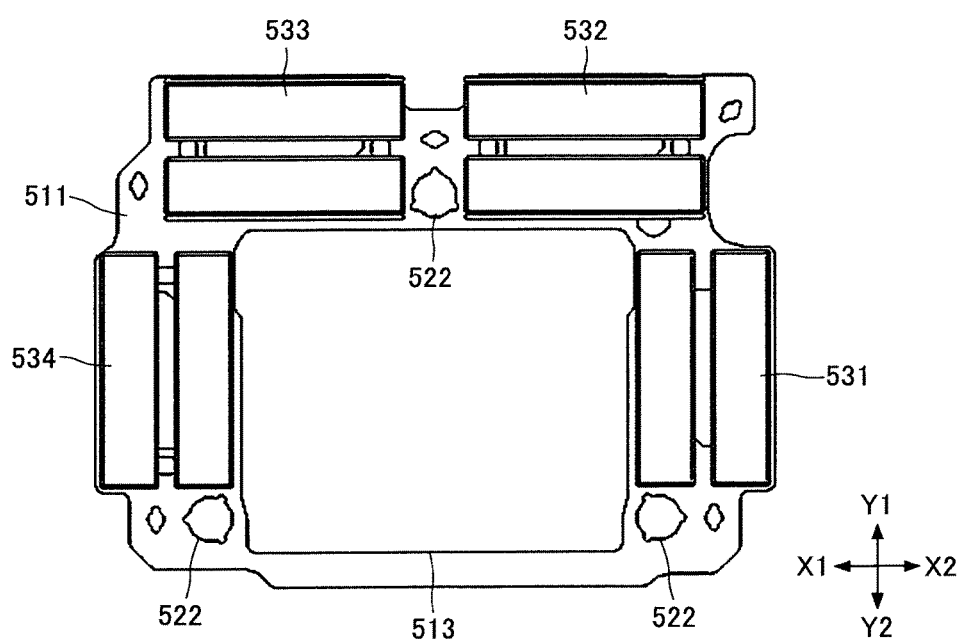

[Fig. 13]
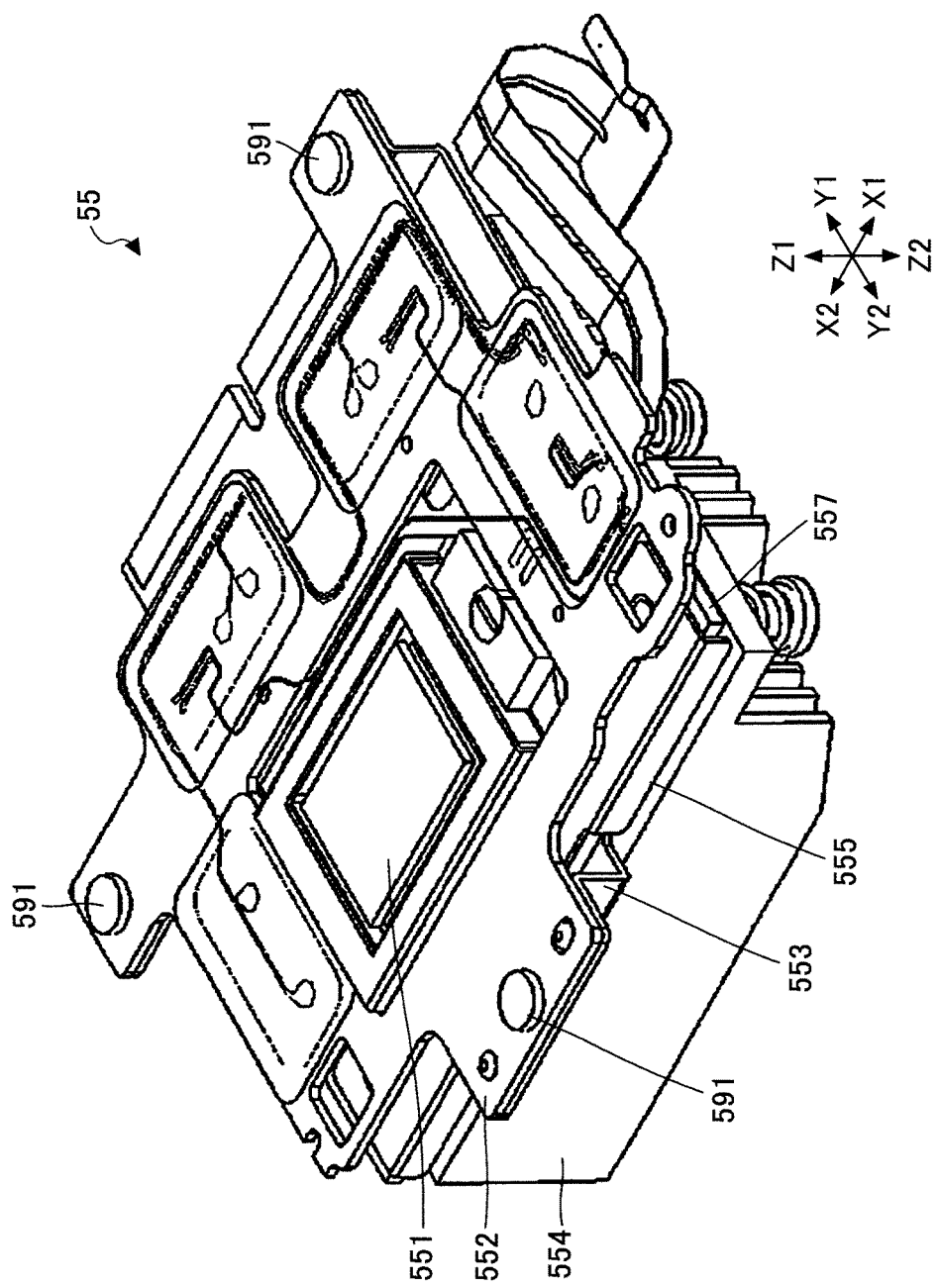

[Fig. 14]
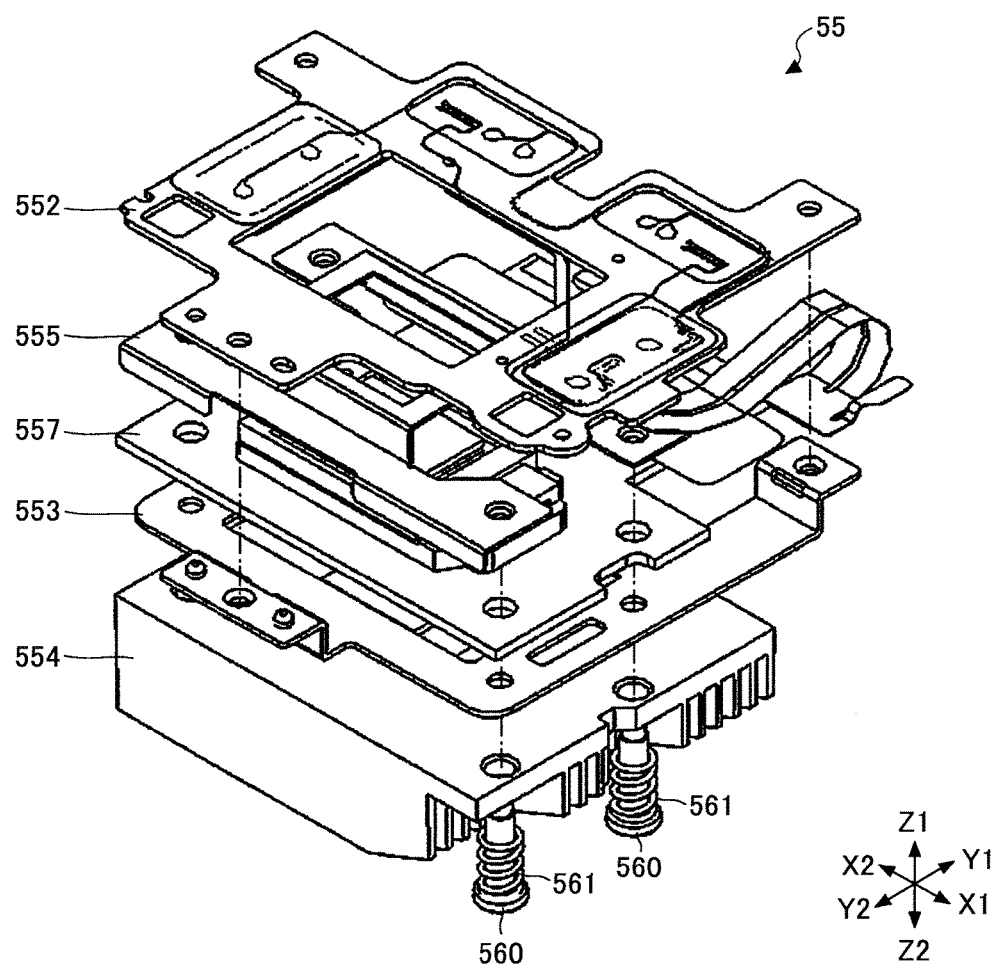

[Fig. 15]
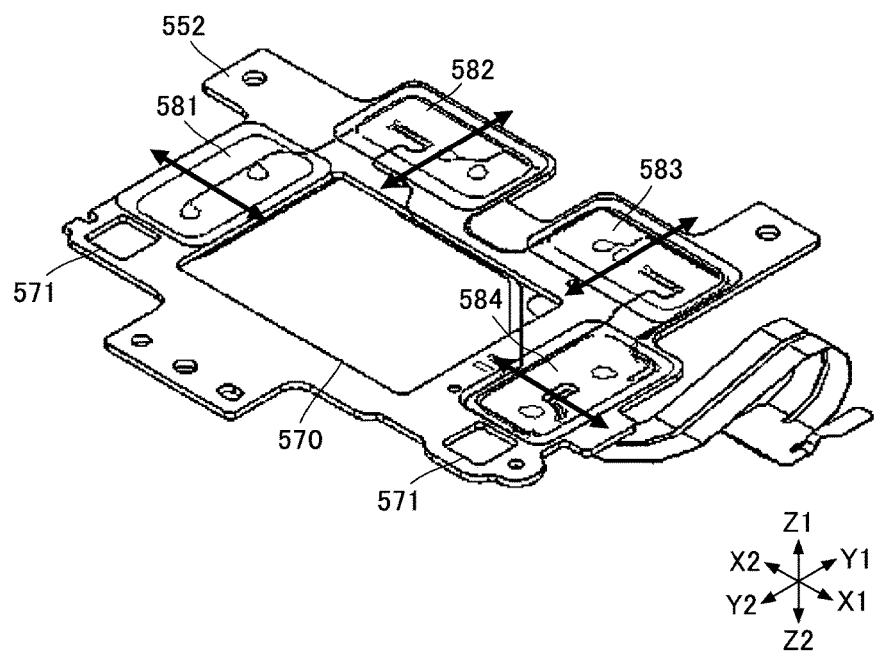

[Fig. 16]
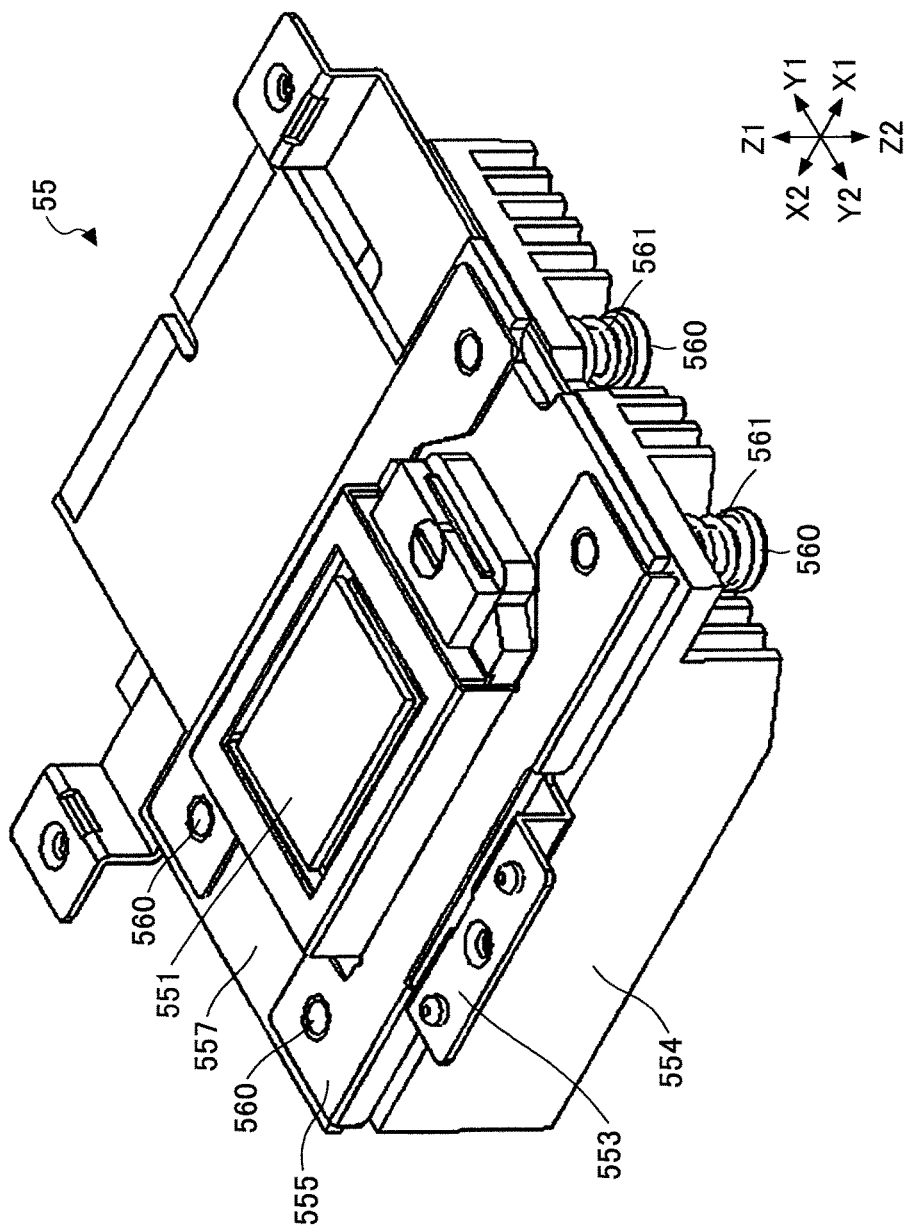

[Fig. 17]
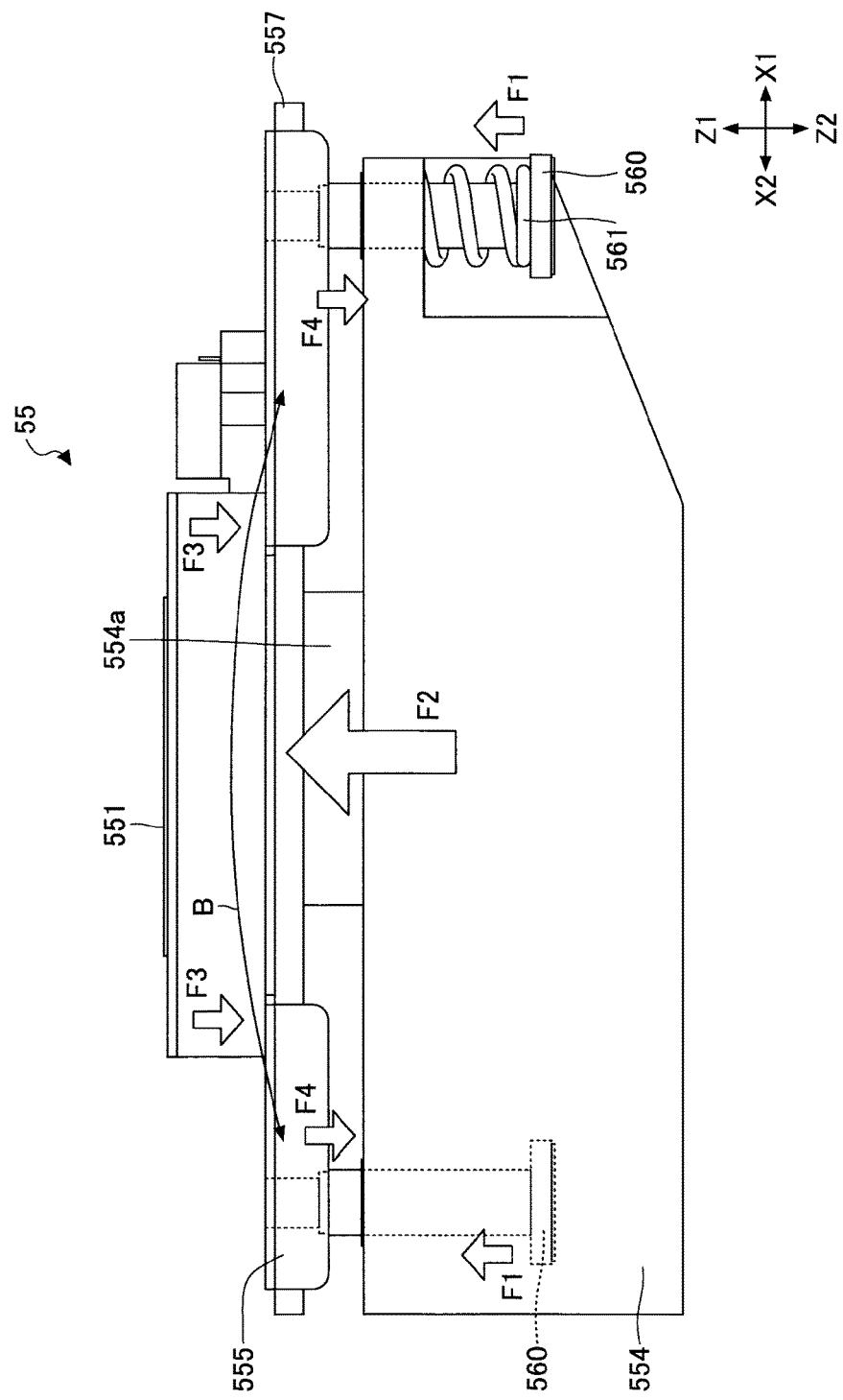

IMAGE FORMATION UNIT AND IMAGE PROJECTION APPARATUS

TECHNICAL FIELD

The present invention relates to an image formation unit and an image projection apparatus.

BACKGROUND ART

An image projection apparatus is known in which an image generation unit generates an image based on image data received from a personal computer (PC) or a digital camera using light emitted by a light source, and the generated image is passed through an optical system including a plurality of lenses to project an image on a screen. For example, a liquid crystal display (LCD) panel or a digital micromirror device (DMD) may be used as the image generation unit.

As a measure to increase the resolution of a projection image of the image projection apparatus, increasing the density of picture elements in the image generation unit is conceivable. However, the manufacturing cost of the image generation unit will increase. To avoid this, an image projection apparatus is proposed in which decentered lenses provided in a projection optical system are moved to shift a projection image on the plane of projection so that the resolution of the projection image is increased. For example, see Japanese Laid-Open Patent Publication No. 2005-084581.

However, it is necessary to provide an additional mechanism for moving the decentered lenses in the projection optical system of the proposed image projection apparatus of Japanese Laid-Open Patent Publication No. 2005-084581. The projection optical system must have a complicated structure and the degree of flexibility of the design will be reduced. Moreover, it is difficult to control the positions of the decentered lenses at high speed and with good accuracy. Specifically, it is difficult to increase the resolution of the projection image by shifting the projection image on the plane of projection through the controlled movement of the decentered lenses by a distance which is less than an interval between two of the picture elements of the image generation unit.

CITATION LIST

Patent Literature

PTL 1: Japanese Laid-Open Patent Publication No. 2005-084581

SUMMARY OF INVENTION

In one aspect, the present invention provides an image projection apparatus which is capable of providing an increased resolution of the projection image.

In one embodiment, the present invention provides an image formation unit including: a movable member; an image generation unit mounted on the movable member and configured to receive light and generate an image based on the received light; and a heat dissipation unit mounted on the movable member and configured to dissipate heat of the image generation unit.

In another embodiment, the present invention provides an image projection apparatus including: a light source; an image generation unit configured to receive light from the light source and generate an image based on the received light; a projection optical system unit configured to project the image generated by the image generation unit; a heat dissipation unit configured to dissipate heat of the image generation unit; and a movable member configured such that a position of the movable member is movable relative to the projection optical system unit, wherein the image generation unit and the heat dissipation unit are mounted on the movable member.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a diagram showing a projector which is an image projection apparatus according to an embodiment.

FIG. 2 is a block diagram showing a functional configuration of the projector.

FIG. 3 is a perspective view of an optical engine of the projector.

FIG. 4 is a diagram showing a lighting optical system unit.

FIG. 5 is a diagram showing an internal configuration of a projection optical system unit.

FIG. 6 is a perspective view of an image displaying unit.

FIG. 7 is a side view of the image displaying unit.

FIG. 8 is a perspective view of a fixed unit.

FIG. 9 is an exploded perspective view of the fixed unit.

FIG. 10 is a diagram showing a support structure of a movable plate held by the fixed unit.

FIG. 11 is an enlarged diagram showing a portion of the support structure of the movable plate held by the fixed unit.

FIG. 12 is a bottom view of a top cover.

FIG. 13 is a perspective view of a movable unit.

FIG. 14 is an exploded perspective view of the movable unit.

FIG. 15 is a perspective view of a movable plate.

FIG. 16 is a perspective view of the movable unit from which the movable plate is removed.

FIG. 17 is a diagram showing a DMD holding structure of the movable unit.

DESCRIPTION OF EMBODIMENTS

A description will be given of embodiments with reference to the accompanying drawings.

FIG. 1 is a diagram showing a projector 1 which is an image projection apparatus according to an embodiment. As shown in FIG. 1, the projector 1 includes a radiation window 3 and an external interface (I/F) 9, and an optical engine which is configured to generate a projection image is provided in the inside of the projector 1. For example, when image data is transmitted to the projector 1 from a personal computer (PC) or a digital camera connected to the external interface 9, the optical engine generates an image based on the received image data and projects the image from the radiation window 3 onto a screen S as shown in FIG. 1.

Note that, in the following drawings, X1-X2 directions represent width directions of the projector 1, Y1-Y2 directions represent height directions of the projector 1, and Z1-Z2 directions represent depth directions of the projector 1. Moreover, in the following description, it is assumed that the radiation window 3 side of the projector 1 corresponds to the top of the projector 1 and the side of the projector 1 opposite to the radiation window 3 corresponds to the bottom of the projector 1.

FIG. 2 is a block diagram showing a functional configuration of the projector 1. As shown in FIG. 2, the projector 1 includes a power source 4, a main switch (SW) 5, an operation unit 7, an external interface (I/F) 9, a system control unit 10, a fan 20, and an optical engine 15.

The power source 4 is connected to a commercial power source, converts voltage and frequency of the commercial power for the internal circuits of the projector 1, and supplies the resulting power to each of the system control unit 10, the fan 20, and the optical engine 15.

The main switch 5 is switched ON or OFF by a user to power on or off the projector 1. While the power source 4 is connected to the commercial power source via a power cord, if the main switch 5 is switched ON, the power source 4 starts supplying power to the respective components of the projector 1, and if the main switch 5 is switched OFF, the power source 4 stops the power supply to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals connected to, for example, a personal computer (PC) or a digital camera, and is configured to supply image data, which is received from the connected apparatus, to the system control unit 10.

The system control unit 10 includes an image control unit 11 and a movement control unit 12. For example, the system control unit 10 may include a CPU (a processor), a ROM, and a RAM as hardware components thereof. The functions of the system control unit 10 may be implemented by instructions from the CPU when a program read from the ROM into the RAM is executed by the CPU.

The image control unit 11 is configured to control a digital micromirror device (DMD) 551 provided in an image displaying unit 50 of the optical engine 15 based on the image data received from the external interface 9, to generate an image to be projected on the screen S.

The movement control unit 12 is configured to move a movable unit 55 (which is provided to be movable in the image displaying unit 50) and control a position of the DMD 551 provided in the movable unit 55. The movable unit 55 is an example of a movable member in the claims.

The fan 20 is rotated under the control of the system control unit 10 to cool a light source 30 of the optical engine 15.

The optical engine 15 includes the light source 30, a lighting optical system unit 40, the image displaying unit 50, and a projection optical system unit 60. The optical engine 15 is controlled by the system control unit 10 to project an image on a screen S as shown in FIG. 1.

Examples of the light source 30 include a mercury high-pressure lamp, a xenon lamp, and a light emitting diode (LED). The light source 30 is controlled by the system control unit 10 to emit light to the lighting optical system unit 40.

The lighting optical system unit 40 includes, for example, a color wheel, a light tunnel, and relay lenses. The lighting optical system unit 40 is configured to guide the light emitted from the light source 30 to the DMD 551 provided in the image displaying unit 50.

The image displaying unit 50 includes a fixed unit 51 which is fixed and supported on the image displaying unit 50, and the movable unit 55 which is provided to be movable relative to the fixed unit 51. The fixed unit 51 is an example of a fixed member in the claims. The movable unit 55 includes the DMD 551 and a position of the movable unit 55 relative to the fixed unit 51 is controlled by the movement control unit 12 of the system control unit 10. The DMD 551 is an example of an image generation unit in the claims. The DMD 551 is controlled by the image control unit 11 of the system control unit 10. The DMD 551 is configured to modulate the light received from the lighting optical system unit 40 and generate a projection image based on the received light.

The projection optical system unit 60 includes, for example, a plurality of projection lenses and a mirror. The projection optical system unit 60 is configured to enlarge the image generated by the DMD 551 of the image displaying unit 50, and project the enlarged image on the screen S.

Next, a configuration of the optical engine 15 of the projector 1 is explained.

FIG. 3 is a perspective view of the optical engine 15 of the projector 1. As shown in FIG. 3, the optical engine 15 includes the light source 30, the lighting optical system unit 40, the image displaying unit 50, and the projection optical system unit 60. The optical engine 15 is provided in the inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image displaying unit 50. The image displaying unit 50 is provided beneath the lighting optical system unit 40. The image displaying unit 50 is configured to generate a projection image based on the light received from the lighting optical system unit 40. The projection optical system unit 60 is provided above the lighting optical system unit 40. The projection optical system unit 60 is configured to project the projection image generated by the image displaying unit 50 onto the screen S which is provided outside the projector 1.

The optical engine 15 of this embodiment is configured to project the image based on the light emitted from the light source 30 in an upward direction. Alternatively, the optical engine 15 may be configured to project the image in a horizontal direction.

FIG. 4 is a diagram showing the lighting optical system unit 40. As shown in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component in which color filters of R (red), G (green), and B (blue) are provided at different portions in a circumferential direction thereof. The color wheel 401 is rotated at high speed so that the light emitted from the light source 30 is divided into RGB color light beams in a time-division manner.

The light tunnel 402 is, for example, a rectangular tube-like component formed of bonded glass sheets. The light tunnel 402 functions to perform multipath reflection of the RGB color light beams passing through the color wheel 401 by the internal surfaces thereof for equalization of luminance distribution, and guides the resulting light beams to the relay lenses 403 and 404.

The relay lenses 403 and 404 function to correct the chromatic aberrations on the optical axis of the light beams emitted from the light tunnel 402 and convert the light beams into converging light beams.

The cylinder mirror 405 and the concave mirror 406 function to reflect the light emitted from the relay lens 404 to the DMD 551 provided in the image displaying unit 50. The DMD 551 is configured to modulate the light reflected from the concave mirror 406 and generate a projection image.

FIG. 5 is a diagram showing an internal configuration of the projection optical system unit 60. As shown in FIG. 5, the projection optical system unit 60 includes projection lenses 601, a folding mirror 602, and a curved surface mirror 603 which are provided in a housing of the projection optical system unit 60.

The projection lenses 601 include a plurality of lenses. The projection lenses 601 function to focus the projection image generated by the DMD 551 of the image displaying unit 50 onto the folding mirror 602. The folding mirror 602 and the curved surface mirror 603 function to reflect the focused projection image so as to be enlarged, and project the resulting image on the screen S which is provided outside the projector 1.

FIG. 6 is a perspective view of the image displaying unit 50. FIG. 7 is a side view of the image displaying unit 50.

As shown in FIG. 6 and FIG. 7, the image displaying unit 50 includes the fixed unit 51 which is fixed and supported, and the movable unit 55 which is provided to be movable to the fixed unit 51.

The fixed unit 51 includes a top plate 511 as a first fixed member, and a base plate 512 as a second fixed member. In the fixed unit 51, the top plate 511 and the base plate 512 are held in parallel and face each other via a predetermined gap between them. The fixed unit 51 is fixed to the bottom of the lighting optical system unit 40.

The movable unit 55 includes the DMD 551, a movable plate 552 as a first movable member, a joint plate 553 as a second movable member, and a heat sink 554. The movable unit 55 is supported to be movable relative to the fixed unit 51 by the fixed unit 51.

The movable plate 552 is provided between the top plate 511 and the base plate 512 of the fixed unit 51. The movable plate 552 is supported by the fixed unit 51 to be movable in a direction which is parallel to the top plate 511 and the base plate 512 and parallel to the surface of the movable plate 552.

The joint plate 553 is fixed to the movable plate 552 with the base plate 512 of the fixed unit 51 being inserted between the movable plate 552 and the joint plate 553. The DMD 551 is fixed to a top surface of the joint plate 553, and the heat sink 554 is fixed to a bottom surface of the joint plate 553. The joint plate 553, which is fixed to the movable plate 552, is supported by the fixed unit 51 to be movable relative to the fixed unit 51 integrally with the movable plate 552, the DMD 551, and the heat sink 554.

The DMD 551 is mounted on a surface of the joint plate 553 on the movable plate 552 side. The DMD 551 is provided to be movable integrally with the movable plate 552 and the joint plate 553. The DMD 551 includes an image generation surface on which a plurality of rotatable micromirrors are arrayed in a lattice formation. A specular surface of each of the micromirrors of the DMD 551 is provided to be slantingly rotatable around a twist shaft. The ON/OFF drive of the micromirrors of the DMD 551 is performed based on an image signal transmitted from the image control unit 11 of the system control unit 10.

For example, in an ON state, an inclination angle of a micromirror is controlled so that the micromirror reflects the light from the light source 30 to the projection optical system unit 60, and in an OFF state, the inclination angle of the micromirror is controlled so that the micromirror reflects the light from the light source 30 to an OFF light plate (which is not illustrated).

In this manner, the inclination angle of each of the micromirrors of the DMD 551 is controlled based on the image signal transmitted from the image control unit 11, and the light emitted from the light source 30 and passing through the lighting optical system unit 40 is modulated and a projection image is generated by the DMD 551.

The heat sink 554 is an example of a heat dissipation unit in the claims. The heat sink 554 is provided so that the heat sink 554 at least partially contacts the DMD 551. Integrally with the DMD 551, the heat sink 554 is mounted on the joint plate 553 which is supported to be movable, and it is possible to efficiently cool the DMD 551 by the contact of the heat sink 554 with the DMD 551. By this configuration of the heat sink 554, the projector 1 is capable of preventing the temperature of the DMD 551 from increasing and capable of reducing problems, such as malfunction and failure, due to the temperature rise of the DMD 551.

FIG. 8 is a perspective view of the fixed unit 51. FIG. 9 is an exploded perspective view of the fixed unit 51.

As shown in FIG. 8 and FIG. 9, the fixed unit 51 includes the top plate 511 and the base plate 512. The top plate 511 and the base plate 512 are made of a flat-shaped plate material. The top plate 511 has a central hole 513 formed in a position corresponding to the DMD 551 of the movable unit 55. The base plate 512 has a central hole 514 formed in a position corresponding to the DMD 551 of the movable unit 55. The top plate 511 and the base plate 512 are supported by plural supports 515 so that the top plate 511 and the base plate 512 are held in parallel and face each other via the predetermined gap between them.

As shown in FIG. 9, an upper end portion of each of the supports 515 is press fitted in a corresponding one of support holes 516 which are formed in the top plate 511, and a lower end portion of the support 515 is inserted in a corresponding one of support holes 517 which are formed in the base plate 512. The lower end portion of each of the supports 515 is formed with an external thread groove. The supports 515 support the top plate 511 and the base plate 512 so that the top plate 511 and the base plate 512 are held in parallel and face each other via the predetermined gap between them.

Moreover, support holes 522 are formed in the top plate 511 to hold support balls 521 rotatably, and support holes 526 are formed in the base plate 512 to hold support balls 521 rotatably.

Cylindrical holding members 523 each of which has an internal thread groove formed in an inner peripheral surface of the holding member 523 are inserted in the support holes 522 of the top plate 511. The holding members 523 hold the support balls 521 rotatably, respectively. Positioning screws 524 are inserted into upper end portions of the holding members 523, respectively. Lower end faces of the support holes 526 of the base plate 512 are closed by lid members 527 and 528, and the support holes 526 of the base plate 512 hold the support balls 521 rotatably.

The support balls 521 which are rotatably held by the support holes 522 and 526 of the top plate 511 and the base plate 512 are respectively in contact with the movable plate 552 provided between the top plate 511 and the base plate 512. Hence, the support balls 521 movably support the movable plate 552.

FIG. 10 is a diagram showing a support structure of the movable plate 552 by the fixed unit 51. FIG. 11 is an enlarged diagram showing a portion (indicated by the letter "A" in FIG. 10) of the support structure of the movable plate 552 by the fixed unit 51.

As shown in FIG. 10 and FIG. 11, in the top plate 511, the support balls 521 are rotatably held by the holding members 523 which are inserted in the support holes 522. In the base plate 512, the support balls 521 are rotatably held by the support holes 526 the lower end faces of which are closed by the lid members 527 and 528.

Each of the support balls 521 is held so that the support ball 521 projects at least partially from the support hole 522 or the support hole 526. Each of the support balls 521 contacts the movable plate 552 provided between the top plate 511 and the base plate 512 to support the movable plate 552. The top surface and the bottom surface of the movable plate 552 are supported by the rotatably held support balls 521 so that the movable plate 552 is movable in the direction which is parallel to the top plate 511 and the base plate 512 and parallel to the top and bottom surfaces of the movable plate 552.

Moreover, the amount of projection of the support ball 521 (provided on the top plate 511 side) from the lower end of the holding member 523 is varied depending on a position of the positioning screw 524 (which contacts the support ball 521 on the side opposite to the movable plate 552). For example, if the positioning screw 524 is displaced in the Z1 direction (upward), the amount of projection of the support ball 521 is decreased and the gap between the top plate 511 and the movable plate 552 is decreased. On the other hand, if the positioning screw 524 is displaced in the Z2 direction (downward), the amount of projection of the support ball 521 is increased and the gap between the top plate 511 and the movable plate 552 is increased.

Hence, the gap between the top plate 511 and the movable plate 552 may be appropriately adjusted by changing the amount of projection of the support ball 521 using the positioning screw 524.

Moreover, as shown in FIG. 8 and FIG. 9, magnets 531, 532, 533 and 534 are mounted on a bottom surface of the top plate 511 on the base plate 512 side.

FIG. 12 is a bottom view of the top plate 511. As shown in FIG. 12, the magnets 531, 532, 533 and 534 are mounted on the bottom surface of the top plate 511 on the base plate 512 side.

The magnets 531, 532, 533 and 534 are provided at four locations which surround the central hole 513 of the top plate 511. Each of the magnets 531, 532, 533 and 534 is made of a pair of magnet pieces having a rectangular parallelepiped shape. The two magnet pieces of each pair are arranged side by side so that longitudinal directions of the two magnet pieces are parallel to each other. Each of the magnets 531, 532, 533 and 534 forms a magnetic field which functions to attract the movable plate 552.

Coils are provided on the top surface of the movable plate 552 to face the magnets 531, 532, 533 and 534, respectively. The magnets 531, 532, 533 and 534 on the top plate 511 and the corresponding coils on the movable plate 552 constitute a movement device configured to move the movable plate 552.

Note that the number and positions of the supports 515 and the support balls 521 which are provided on the fixed unit 51 are not limited to the configuration of this embodiment, and it is sufficient that the supports 515 and the support balls 521 are provided to support the movable plate 552 movably.

FIG. 13 is a perspective view of the movable unit 55. FIG. 14 is an exploded perspective view of the movable unit 55. As shown in FIG. 13 and FIG. 14, the movable unit 55 includes the DMD 551, the movable plate 552, the joint plate 553, the heat sink 554, a holding member 555, and a DMD base 557. The movable unit 55 is supported to be movable relative to the fixed unit 51.

As described above, the movable plate 552 is provided between the top plate 511 and the base plate 512 of the fixed unit 51 and supported by the support balls 521 to be movable in the direction parallel to the top and bottom surfaces of the movable plate 552.

FIG. 15 is a perspective view of the movable plate 552. As shown in FIG. 15, the movable plate 552 is made of a flat-shaped plate material. The movable plate 552 has a central hole 570 in the position corresponding to the DMD 551 which is mounted on the DMD base 557, and coils 581, 582, 583 and 584 are formed on the periphery of the central hole 570.

Each of the coils 581, 582, 583 and 584 is formed of electric wires wound around a shaft parallel to the Z1-Z2 directions. The coils 581, 582, 583 and 584 are provided in recesses formed in the bottom surface of the top plate 511 on the movable plate 552 side, and the coils are enclosed with coverings. The coils 581, 582, 583 and 584 on the movable plate 552 and the magnets 531, 532, 533 and 534 on the top plate 511 constitute the movement device configured to move the movable plate 552.

In the state in which the movable unit 55 is supported by the fixed unit 51, the magnets 531, 532, 533 and 534 on the top plate 511 and the coils 581, 582, 583 and 584 on the movable plate 552 are provided to face each other, respectively. When electric current flows through the coils 581, 582, 583 and 584, Lorentz forces as driving forces to move the movable plate 552 are generated by the magnetic fields formed by the coils 581, 582, 583 and 584 and the magnets 531, 532, 533 and 534.

The movable plate 552 is linearly moved or rotated to the fixed unit 51 within an XY plane by the Lorentz forces as the driving forces which are generated by the magnets 531, 532, 533 and 534 and the coils 581, 582, 583 and 584.

The magnitude and direction of the current flowing through each of the coils 581, 582, 583 and 584 are controlled by the movement control unit 12 of the system control unit 10. The movement control unit 12 controls the direction of movement (or rotation), the amount of movement and the rotational angle of the movable plate 552 by changing the magnitude and direction of the current flowing through each of the coils 581, 582, 583 and 584.

In this embodiment, the coil 581 and the magnet 531, and the coil 584 and the magnet 534 are arranged to face each other in the X1 and X2 directions, and the coils 581 and 584 and the magnets 531 and 534 are formed as a first drive unit. If electric current flows through the coils 581 and 584, Lorentz forces in the X1 or X2 direction are generated as shown in FIG. 15. The movable plate 552 is moved in the X1 or X2 direction by the Lorentz force generated by the coil 581 and the magnet 531 and the Lorentz force generated by the coil 584 and the magnet 534.

Moreover, in this embodiment, the coil 582 and the magnet 532, and the coil 583 and the magnet 533 are arranged side by side in the X1 or X2 direction as a second drive unit, and the longitudinal direction of the magnets 532 and 533 is arranged to be perpendicular to the longitudinal direction of the magnets 531 and 534. If electric current flows through the coil 582 and the coil 583, Lorentz forces in the Y1 or Y2 direction are generated as shown in FIG. 15.

The movable plate 552 may be moved in the Y1 or Y2 direction by the Lorentz force generated by the coil 582 and the magnet 532 and the Lorentz force generated by the coil 583 and the magnet 533 with the directions of the Lorentz forces being the same. Moreover, the movable plate 552 may be rotated in the XY plane by the Lorentz force generated by the coil 582 and the magnet 532, and the Lorentz force generated by the coil 583 and the magnet 533 with the directions of the Lorentz forces being opposite to each other.

For example, if electric current is supplied so that a Lorentz force in the Y1 direction is generated by the coil 582 and the magnet 532 and a Lorentz force in the Y2 direction is generated by the coil 583 and the magnet 533, the movable plate 552 is rotated clockwise in a top view. On the other hand, if electric current is supplied so that a Lorentz force in the Y2 direction is generated by the coil 582 and the magnet 532 and a Lorentz force in the Y1 direction is generated by the coil 583 and the magnet 533, the movable plate 552 is rotated counterclockwise in a top view.

In the movable plate 552, movable range restriction holes 571 are formed at locations corresponding to the supports 515 of the fixed unit 51. The supports 515 of the fixed unit 51 are inserted in the movable range restriction holes 571. If the movable plate 552 is greatly moved due to vibration or certain malfunction, the supports 515 come in contact with the movable range restriction holes 571, and the movable range of the movable plate 552 may be restricted.

As described above, in this embodiment, the movement control unit 12 of the system control unit 10 is configured to move the movable plate 552 to an arbitrary position within the movable range by controlling the magnitude and directions of the current flowing through the coils 581, 582, 583 and 584.

Note that the number and positions of the coils 581, 582, 583 and 584 and the magnets 531, 532, 533 and 534, which constitute the movement device, are not limited to this embodiment. Another embodiment different from this embodiment may be used if the movable plate 552 can be moved to an arbitrary position. For example, the magnets in the movement device may be mounted on the top surface of the top plate 511, or mounted on any of the surfaces of the base plate 512. Alternatively, the magnets may be mounted on the movable plate 552, and the coils may be mounted on the top plate 511 or the base plate 512.

Moreover, the number, the positions, and the shape of the movable range restriction holes 571 are not limited to the configuration of this embodiment. For example, one movable range restriction hole or plural movable range restriction holes 571 may be provided. The movable range restriction holes 571 may have a rectangular or circular shape.

As shown in FIG. 13, the joint plate 553 is fixed to the bottom surface of the movable plate 552 (on the base plate 512 side), and the movable plate 552 is movably supported by the fixed unit 51. The joint plate 553 is made of a flat-shaped plate material. The joint plate 553 has a central hole in the position corresponding to the DMD 551. Folded portions provided on the periphery of the joint plate 553 are fixed to the bottom surface of the movable plate 552 by three screws 591 (see FIG. 13).

FIG. 16 is a perspective view of the movable unit 55 from which the movable plate 552 is removed. As shown in FIG. 16, the DMD 551 is mounted on the top surface of the joint plate 553 and the heat sink 554 is mounted on the bottom surface of the joint plate 553. The joint plate 553, which is fixed to the movable plate 552, is provided to be movable relative to the fixed unit 51 according to the movement of the movable plate 552 integrally with the DMD 551 and the heat sink 554.

The DMD 551 is mounted on the DMD base 557, and the DMD base 557 is interposed between the holding member 555 and the joint plate 553. Hence, the DMD 551 is fixed to the joint plate 553 via the DMD base 557. As shown in FIG. 14 and FIG. 16, the holding member 555, the DMD base 557, the joint plate 553, and the heat sink 554 are laminated and fixed by shoulder screws 560 (which are fastener members) and springs 561 (which are pressure units).

FIG. 17 is a diagram showing a DMD holding structure of the movable unit 55. FIG. 17 is a side view of the movable unit 55, and in FIG. 17, the illustration of the movable plate 552 and the joint plate 553 is omitted.

As shown in FIG. 17, the heat sink 554 includes a projection 554a which contacts the bottom surface of the DMD 551 via a through hole formed in the DMD base 557 when the heat sink 554 is fixed to the joint plate 553. Note that, alternatively, the projection 554a of the heat sink 554 may be a projection provided on the bottom surface of the DMD base 557 to contact the position of the heat sink 554 corresponding to the DMD 551.

In order to increase the effect of cooling the DMD 551 by the heat sink 554, a heat transfer sheet that is elastically deformable may be interposed between the projection 554a of the heat sink 554 and the DMD 551. In such a case, the thermal conductivity between the projection 554a of the heat sink 554 and the DMD 551 will be increased by the heat transfer sheet, and thereby the effect of cooling the DMD 551 by the heat sink 554 will be increased.

As described above, the holding member 555, the DMD base 557, and the heat sink 554 are laminated and fixed by the shoulder screws 560 and the springs 561. If the shoulder screws 560 are tightened, the springs 561 are compressed in the Z1-Z2 directions, and a force F1 in the Z1 direction (as indicated in FIG. 17) is produced by the spring 561. The heat sink 554 is pressed onto the DMD 551 by a force F2 in the Z1 direction which is the resultant of the forces F1 produced by the springs 561.

In this embodiment, the shoulder screws 560 and the springs 561 are provided at four locations, and the force F2 acting on the heat sink 554 is equal to the resultant of the forces F1 produced by the four springs 561. The force F2 from the heat sink 554 is exerted on the holding member 555 which holds the DMD base 557 on which the DMD 551 is mounted. As a result, a reaction force F3 in the Z2 direction equivalent to the force F2 from the heat sink 554 is exerted on the holding member 555, so that the DMD base 557 can be held between the holding member 555 and the joint plate 553.

A force F4 in the Z2 direction acts on the shoulder screws 560 and the springs 561 due to the force F3 acting on the holding member 555. Because the springs 561 are provided at four locations, the force F4 acting on each of the springs is equivalent to one fourth (¼) of the force F3 acting on the holding member 555, and the force F4 and the force F1 are in equilibrium.

The holding member 555 is formed like a leaf spring and made of a material which can be bent as indicated by the arrow B in FIG. 17. The holding member 555 is bent by the upward force from the projection 554a of the heat sink 554, the downward force to push back the heat sink 554 in the Z2 direction is produced by the holding member 555, and firm contact between the DMD 551 and the heat sink 554 can be maintained.

As described above, in the movable unit 55, the movable plate 552 and the joint plate 553 (on which the DMD 551 and the heat sink 554 are mounted) are movably supported by the fixed unit 51. The position of the movable unit 55 is controlled by the movement control unit 12 of the system control unit 10. Moreover, the heat sink 554 contacting the DMD 551 by pressure is mounted on the movable unit 55, and the projector 1 is capable of having reduced problems, such as malfunction and failure, due to the temperature rise of the DMD 551.

As described above, in the projector 1 of this embodiment, the DMD 551 which generates a projection image is mounted on the movable unit 55, and the position of the DMD 551 is controlled by the movement control unit 12 of the system control unit 10 together with the movable unit 55.

For example, the movement control unit 12 controls the position of the movable unit 55 by a high speed movement between positions lying apart by a distance less than the array interval of the micromirrors of the DMD 551 at a predetermined cycle corresponding to a frame rate during image projection.

At this time, the image control unit 11 transmits an image signal to the DMD 551 to generate a projection image shifted according to each of the positions.

For example, the movement control unit 12 performs reciprocation movement of the DMD 551 between two positions lying apart by the distance less than the array interval of the micromirrors of the DMD 551 in the X1-X2 directions and the Y1-Y2 directions at the predetermined cycle. At this time, the image control unit 11 controls the DMD 551 to generate a projection image shifted according to each of the positions, and it is possible to make the resolution of the projection image to be twice the resolution of the DMD 551. Moreover, the resolution of the projection image can be made to be more than twice the resolution of the DMD 551 by increasing the movement range of the DMD 551.

The movement control unit 12 moves the DMD 551 and the movable unit 55 at the predetermined cycle and the image control unit 11 controls the DMD 551 to generate the projection image according to the position. Hence, it is possible to obtain the resolution of the projection image which is higher than the resolution of the DMD 551.

In the projector 1 of this embodiment, the movement control unit 12 controls the DMD 551 so that the DMD 551 is rotated integrally with the movable unit 55, and the projection image can be rotated without reducing the size of the projection image. For example, in a conventional projector in which an image generation unit, such as a DMD, is fixed, if the size of a projection image is not reduced, the projection image cannot be rotated while maintaining the aspect ratio of the projection image. In contrast, in the projector 1 of this embodiment, the DMD 551 can be rotated, and the rotation of the DMD 551 and the adjustment of the inclination can be performed without reducing the size of the projection image.

As described in the foregoing, in the projector 1 of this embodiment, the movement of the DMD 551 is possible, and it is possible to provide an increased resolution of the projection image. Moreover, the DMD 551 and the heat sink 554 to cool the DMD 551 are mounted on the movable unit 55, the heat sink 554 is brought in contact with the DMD 551, the effect of cooling the DMD 551 by the heat sink 554 is increased, and the temperature rise of the DMD 551 is prevented. Hence, the projector 1 is capable of having reduced problems, such as malfunction and failure, due to the temperature rise of the DMD 551.

As described in the foregoing, the image projection apparatus according to the invention is capable of providing an increased resolution of a projection image.

The image projection apparatus according to the invention is not limited to the above-described embodiments, and changes and modifications may be made without departing from the scope of the present invention.

The present application is based upon and claims the benefit of priority of Japanese Patent Application No. 2014-218418, filed on Oct. 27, 2014, the contents of which are incorporated herein by reference in their entirety.

The invention claimed is:

1. An image formation unit comprising:
   a first fixed plate;
   a second fixed plate fixed and supported on the first fixed plate;
   a first movable plate disposed between the first fixed plate and the second fixed plate and configured to be movable in a predetermined direction;
   a second movable plate fixed to the first movable plate and interposing the second fixed plate between the first movable plate and the second movable plate;
   an image generation unit mounted on the second movable plate and configured to receive light from a light source, modulate the light using a plurality of mirrors arrayed therein and generate an image by the modulated light;
   a heat dissipation unit fixed to the second movable plate and configured to contact the image generation unit;
   a movement device configured to move the first movable plate and the second movable plate;
   a holding member configured to hold the image generation unit on the second movable plate;
   fastener members configured to hold and fix the second movable plate, the holding member and the heat dissipation unit on top of each other; and
   a movement control unit configured to control movement of at least the first movable plate and the second movable plate using the movement device by a distance less than an array interval of the mirrors of the image generation unit at a predetermined cycle.

2. The image formation unit according to claim 1, wherein the first movable plate is movably held between the first fixed plate and the second fixed plate so that the first movable plate is movable relative to the first fixed plate.

3. The image formation unit according to claim 1, wherein the movement device is configured to include:
   a magnetic member mounted on the first fixed plate; and
   a coil mounted on the first movable plate.

4. The image formation unit according to claim 3, wherein, when current flows through the coil, the first movable plate is moved.

5. The image formation unit according to claim 1, wherein the first fixed plate and the second fixed plate are provided to face each other.

6. The image formation unit according to claim 1, wherein the image generation unit and the heat dissipation unit are mounted on the second movable plate.

7. The image formation unit according to claim 1, wherein the movement device is configured to include:
   a magnetic member mounted on the first movable plate; and
   a coil mounted on either the first fixed plate or the second fixed plate.

8. The image formation unit according to claim 7, wherein the image generation unit and the heat dissipation unit are mounted on the second movable plate.

9. An image projection apparatus comprising:
a light source;
a first fixed plate;
a second fixed plate fixed and supported on the first fixed plate;
a first movable plate disposed between the first fixed plate and the second fixed plate and configured to be movable in a predetermined direction;
a second movable plate fixed to the first movable plate and interposing the second fixed plate between the first movable plate and the second movable plate;
an image generation unit mounted on the second movable plate and configured to receive light from the light source, modulate the light using a plurality of mirrors arrayed therein and generate an image by the modulated light;
a projection optical system unit configured to project the image generated by the image generation unit;
a heat dissipation unit fixed to the second movable plate and configured to contact the image generation unit;
a movement device configured to move the first movable plate and the second movable plate;
a holding member configured to hold the image generation unit on the second movable plate;
fastener members configured to hold and fix the second movable plate, the holding member and the heat dissipation unit on top of each other; and
a movement control unit configured to control movement of at least the first movable plate and the second movable plate using the movement device by a distance less than an array interval of the mirrors of the image generation unit at a predetermined cycle.

10. The image projection apparatus according to claim 9, further comprising:
a lighting optical system unit configured to emit the light from the light source to the image generation unit;
wherein the first fixed plate is fixed to the lighting optical system unit, and
the first movable plate is movably held between the first fixed plate and the second fixed plate so that a position of the first movable plate relative to the projection optical system unit is movable.

11. The image projection apparatus according to claim 9, wherein the movement device is configured to include:
a magnetic member mounted on the first fixed plate, and
a coil mounted on the first movable plate.

12. The image projection apparatus according to claim 11, wherein, when current flows through the coil, the first movable plate is moved.

13. The image projection apparatus according to claim 9, wherein
the first fixed plate and the second fixed plate are provided to face each other.

14. The image projection apparatus according to claim 9, wherein the image generation unit and the heat dissipation unit are mounted on the second movable plate.

15. The image projection apparatus according to claim 9, wherein
the movement device is configured to include:
a magnetic member mounted on the first movable plate; and
a coil mounted on either the first fixed plate or the second fixed plate.

16. The image projection apparatus according to claim 15, wherein the image generation unit and the heat dissipation unit are mounted on the second movable plate.

* * * * *